(12) United States Patent
Hedtke

(10) Patent No.: US 7,412,893 B2
(45) Date of Patent: Aug. 19, 2008

(54) REDUNDANT MECHANICAL AND ELECTRONIC REMOTE SEAL SYSTEM

(75) Inventor: Robert Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 127 days.

(21) Appl. No.: 11/387,550

(22) Filed: Mar. 23, 2006

(65) Prior Publication Data

US 2007/0220985 A1 Sep. 27, 2007

(51) Int. Cl.
*G01L 7/02* (2006.01)
(52) U.S. Cl. ................................ 73/730; 73/708
(58) Field of Classification Search .............. 73/708, 73/706, 730
See application file for complete search history.

(56) References Cited

U.S. PATENT DOCUMENTS

| | | | |
|---|---|---|---|
| 4,528,855 A | 7/1985 | Singh | |
| 5,058,435 A | 10/1991 | Terry et al. | |
| 5,477,738 A | 12/1995 | Tobita et al. | |
| 5,495,768 A * | 3/1996 | Louwagie et al. | 73/706 |
| 5,537,869 A | 7/1996 | Lopez | |
| 5,606,513 A | 2/1997 | Louwagie et al. | |
| 5,635,649 A | 6/1997 | Tobita et al. | |
| 5,637,803 A | 6/1997 | Schalk et al. | |
| 5,811,690 A * | 9/1998 | Hershey | 73/861.42 |
| 5,899,962 A | 5/1999 | Louwagie et al. | |
| 6,000,427 A | 12/1999 | Hutton | |
| 6,029,524 A | 2/2000 | Klauder et al. | |
| 6,038,961 A * | 3/2000 | Filippi et al. | 92/98 R |
| 6,079,443 A | 6/2000 | Hutton | |
| 6,401,541 B1 | 6/2002 | Kurtz | |
| 6,619,142 B1 | 9/2003 | Forster et al. | |
| 7,036,381 B2 * | 5/2006 | Broden et al. | 73/708 |
| 2005/0225035 A1 | 10/2005 | Sundet | 277/590 |
| 2005/0284227 A1 * | 12/2005 | Broden et al. | 73/708 |
| 2006/0162458 A1 * | 7/2006 | Broden | 73/708 |
| 2006/0162459 A1 * | 7/2006 | Broden | 73/715 |

* cited by examiner

*Primary Examiner*—Andre J. Allen
(74) *Attorney, Agent, or Firm*—Kinney & Lange, P.A.

(57) ABSTRACT

A redundant pressure transmitter for redundantly measuring pressure of a process fluid comprises a transmitter housing, transmitter circuitry, a remote seal assembly including a first pressure sensor, and a second pressure sensor positioned in the transmitter housing. The remote seal assembly also comprises a remote seal flange, a communication system and a capillary tube. The remote seal flange communicates with the process fluid and the first pressure sensor senses the process fluid pressure at the remote seal flange. The communication system relays output of the first pressure sensor to the transmitter circuitry, and the capillary tube communicates the process fluid pressure to the transmitter housing via a fill fluid, where the second pressure sensor senses the pressure of the process fluid through the fill fluid.

33 Claims, 4 Drawing Sheets

REDUNDANT MECHANICAL AND ELECTRONIC REMOTE SEAL SYSTEM

BACKGROUND OF THE INVENTION

This invention relates generally to process instruments used in industrial process control systems. More particularly, the present invention relates to pressure transmitters having redundant mechanical and electronic remote seal systems.

Pressure transmitters may be used to remotely monitor the pressure of a process fluid. The pressure transmitter includes circuitry that conditions signals for a pressure sensor and transmits an output to a remote location where it can be monitored as representing the magnitude of the pressure. Remote seals, or remote diaphragm assemblies, are often used to distance the pressure transmitter from hazardous measurement environments, or for linking the pressure transmitter with inconveniently located process fluids. For example, remote seals are often used with corrosive or high temperature process fluids such as in chemical plants or oil refineries.

Typically, in those situations, a mechanical remote seal having a diaphragm assembly and a capillary tube can be used to couple the pressure transmitter to the process fluid while the pressure transmitter is located a safe distance away. These hydraulic remote seal systems communicate with the process fluid through a thin, flexible diaphragm, which is used to isolate the process fluid from a fill fluid used in the capillary tube. As the diaphragm flexes, the incompressible fill fluid translates pressure change through the capillary tube to a diaphragm located in the pressure transmitter. Deflection of the pressure transmitter diaphragm is transmitted through another fill fluid to a pressure sensor, which produces a signal relating to the pressure of the process fluid.

Capillary tubes can extend up to twenty-five meters in order to couple the pressure transmitter with the process fluid, which contributes to several drawbacks of mechanical, capillary tube remote seals. For example, lengthy capillary tubes produce slow response times, and numerous connection points have the potential to leak fill fluid resulting in inaccurate sensing. Also, for differential pressure readings it is necessary to use two remote seals, in either a balanced or tuned configuration. For differential pressure sensing, two remote seals relay two pressures to a differential pressure sensor in the transmitter. In balanced configurations, where two equal length capillary tubes are used in order to equalize back pressure, one of the capillaries typically is longer than necessary for the application. This is both costly and can produce additional uncertainty in the pressure readings. In tuned configurations, where the transmitter is calibrated to reconcile the back pressures created in the unequal length capillaries, temperature variations in the work environment can cause drift in the calibration, also adding uncertainty to the pressure readings.

Electronic remote seal systems have also been proposed in which the remote seal is in electronic communication with the process transmitter. With these configurations, a gage pressure sensor is positioned on the remote seal and the sensor output signal is transmitted to the process transmitter, either through a wire-based or wireless electronic communication system. For differential pressure readings, the remote seal gage pressure is then compared with another gage pressure detected either at the pressure transmitter or another remote seal. The pressure transmitter circuitry then calculates the differential pressure. Thus, electronic remote seals eliminate the drawbacks associated with capillary tubes. There are, however, drawbacks in calculating differential pressure from two gage pressures, rather than directly sensing differential pressure with a differential sensor. In differential pressure sensors, common mode errors, such as temperature effects or line pressure errors, are largely cancelled out because each pressure is centrally sensed. When comparing two gage pressures, the common point of reference is lost and each pressure reading introduces its own errors.

BRIEF SUMMARY OF THE INVENTION

The present invention is directed to a redundant process transmitter for measuring pressure of a process fluid. The process transmitter comprises a transmitter housing, transmitter circuitry, a remote seal assembly including a first pressure sensor, and a second pressure sensor positioned in the transmitter housing. The remote seal assembly also comprises a remote seal flange, a communication system and a capillary tube. The remote seal flange couples to the process fluid and the first pressure sensor senses the process fluid pressure at the remote seal housing. The communication system relays an output of the first pressure sensor to the transmitter circuitry, and the capillary tube communicates the process fluid pressure to the transmitter housing via fill fluid, where the second pressure sensor senses the pressure of the process fluid through the fill fluid.

DETAILED DESCRIPTION

Figure 1:
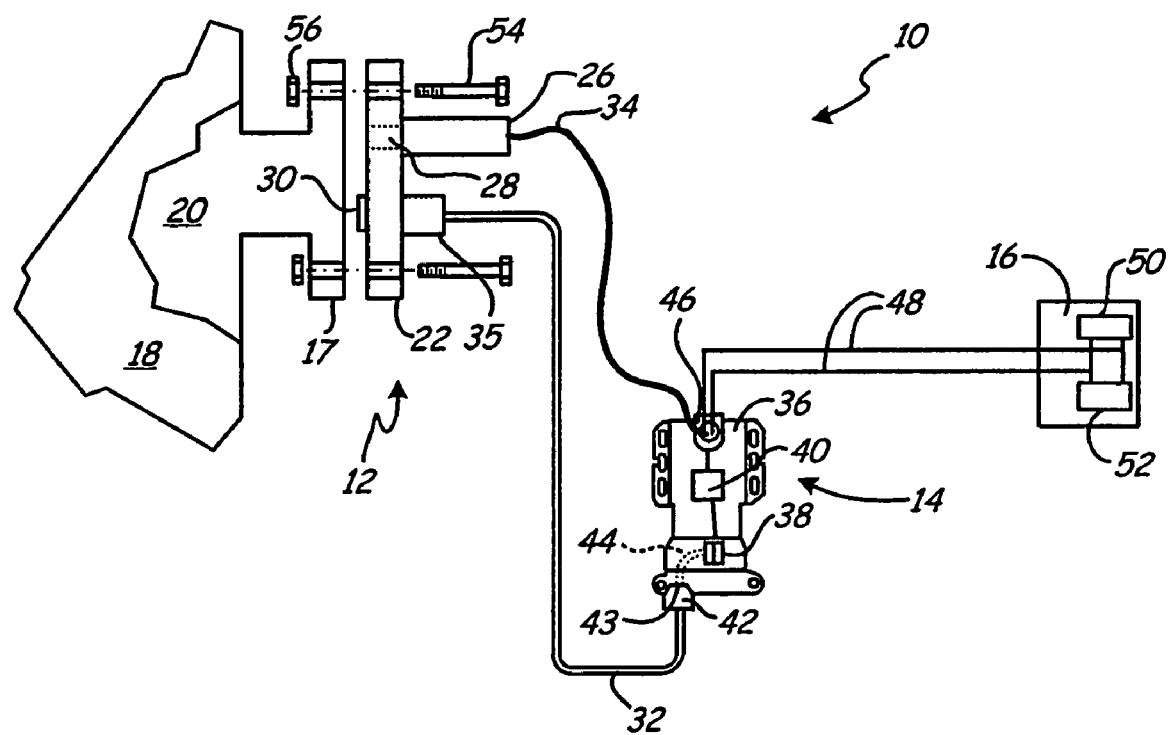
FIG. 1 shows a process control system in which the redundant process transmitter of the present invention is used.
Figure 3:
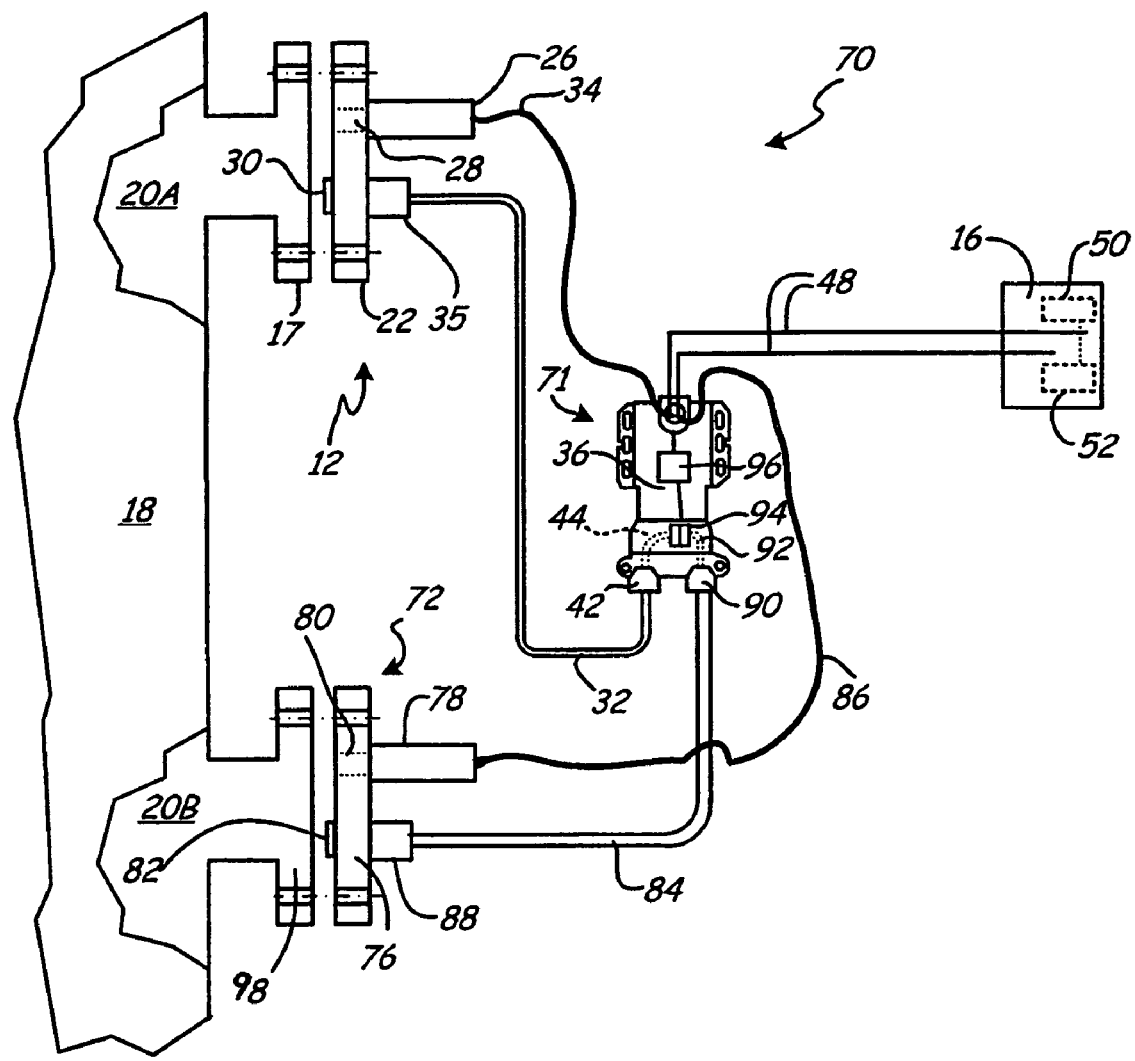
FIG. 3 shows the redundant process transmitter of the present invention configured for differential pressure measurement.

FIG. 1 shows process control system 10, which includes remote seal 12, process transmitter 14, control room 16, vessel flange 17, vessel 18 and process fluid 20. Remote seal 12 comprises process flange 22, first remote pressure transmitter 26, process port 28, isolation diaphragm 30, capillary tube 32, capillary coupling 35 and communication link 34. Process transmitter 14 includes housing 36, first sensor 38, transmitter circuitry 40, capillary coupling 42, transmitter diaphragm 43, passageway 44 and wiring conduits 46. Control room 16 includes control loop 48, power supply 50 and communication system 52. Process transmitter 14 is shown in a gage pressure configuration for sensing the gage pressure of process fluid 20. In other embodiments, as shown in FIG. 3, process transmitter 14 is fitted with a second remote seal system so that differential pressure can be sensed. Process control system 10 provides a redundant pressure sensing system in which the pressure of process fluid 20 is remotely determined by separate electronic and mechanical means; the sensed pressures are compared utilizing transmitter electronics 40, and then monitored and diagnosed at control room 16.

Process flange 22 of remote seal 12 is mounted to vessel flange 17, typically with four bolts 54 and nuts 56. Process fluid 20 pressurizes remote seal 12 through process port 28 and diaphragm 30. Process port 28 and isolation diaphragm 30 provide two outlets for sensing the pressure of process fluid 20 with two separate sensing systems. The first outlet, process port 28, is used with pressure transmitter 26 to detect the pressure of process fluid 20 at the site of vessel 18. The second outlet, diaphragm 30, is used in conjunction with capillary 32 to relay the pressure of process fluid 20 to first sensor 38 of transmitter 14.

First sensor 38 produces a first pressure signal that is representative of the pressure of process fluid 20, based upon the deflection of diaphragm 30. The pressure of process fluid 20 is mechanically transmitted to first sensor 38 utilizing a hydraulic remote seal system. Diaphragm 30 deflects under the pressure of process fluid 20, and capillary 32 relays the pressure to transmitter 14 through a first fill fluid. Capillary tube 32 typically comprises stainless steel tubing. Capillary 32 is connected with remote seal 12 using coupling 35 and with transmitter 14 using coupling 42. At coupling 42, capillary 32 is connected with passageway 44, which is in contact with first sensor 38. Passageway 44 is isolated from capillary 32 with transmitter diaphragm 43 and filled with a second fill fluid. The deflection of diaphragm 30 under the pressure of process fluid 20 is communicated to first sensor 38 by the first and second fill fluids present in capillary 32 and passageway 44. Thus, the mechanical remote seal sub-system, including first sensor 38, detects the pressure of process fluid 20 in vessel 18, and produces the first pressure signal, which is conveyed to transmitter circuitry 40.

Pressure transmitter 26 produces a second pressure signal representative of the pressure of process fluid 20. The second pressure signal is electronically transmitted to transmitter circuitry 40 of transmitter 14 through communication link 34. Communication link 34 connects with transmitter circuitry 40 through wiring conduits 46, which are also used to connect transmitter circuitry 40 with control loop 48. Communication link 34 can be any suitable communication means, such as a wire-based protocol such as HART, Fieldbus or CAN, or a wireless system. In wire-based systems, communication link 34 also includes power delivery means to pressure transmitter 26 from process transmitter 14. In wireless systems, power is delivered to sensing apparatus 26 through an independent power source such as a battery. Thus, the electronic remote seal sub-system, including pressure transmitter 26, detects the pressure of process fluid 20 in vessel 18, and produces the second pressure signal, which is conveyed to transmitter circuitry 40.

Transmitter circuitry 40 of process transmitter 14 receives the first and second pressure signals from first sensor 38 and communication link 34, respectively. Control room 16 supplies power to process transmitter 14 using power supply 50 and communicates with transmitter circuitry 40 using communication system 52 over control loop 48. Thus, transmitter 14 is able to perform various analyses of the first and second pressure signals and conveys the results to control room 16 for remote monitoring of the pressure of process fluid 20. Process control loop 48 can be, for example, a 4-20 mA control loop, a wired digital communication network, a wireless network or any other suitable communication system. In other embodiments, transmitter circuitry 40 transmits the first and second pressure signals to control room 16 where analyses can be alternatively or additionally performed. In other embodiments, process transmitter 14 includes means for locally monitoring the pressure, such as through an LCD display or a handheld reader device. In still other embodiments, process transmitter 14 does not include control loop 48.

Figure 2A:
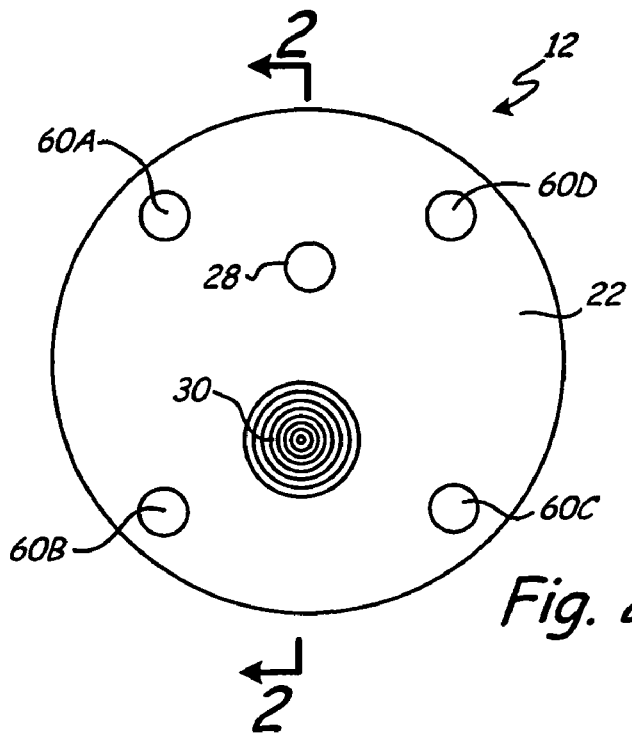
FIG. 2A shows the process fluid interface side of the redundant remote seal of the present invention.
Figure 2B:
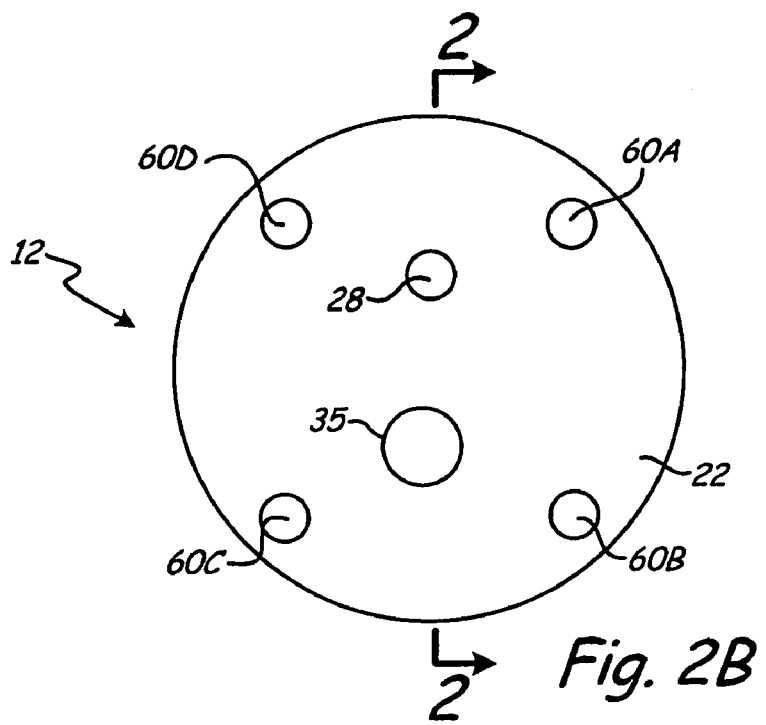
FIG. 2B shows the hardware side of the redundant remote seal of the present invention.

FIG. 2A shows the process fluid interface side of redundant remote seal 12, which includes flange 22, process port 28, isolation diaphragm 30, and mounting holes 60A-60D. FIG. 2B shows the hardware side of redundant remote seal 12, which includes flange 22, process port 28, coupling 35, and mounting holes 60A-60D. Flange 22 is secured to vessel flange 17 of vessel 18 utilizing mounting holes 60A-60D and, for example, threaded fasteners such as bolt 54. Four mounting holes are depicted in FIGS. 2A and 2B, however, any suitable number of mounting holes may be used. Flange 22 is composed of stainless steel or other suitable materials. Remote seal 12 can be mounted on vessel 18 with any desired orientation. In one embodiment, remote seal 12 is mounted with process port 28 and diaphragm 30 in a horizontal configuration such that they detect equivalent pressures in vessel 18.

Process port 28 and diaphragm 30 provide interfaces with process fluid 20. Process diaphragm 30 isolates process fluid 20 from the fill fluid in capillary 32. Process diaphragm 30 is constructed as is known in the art and is typically composed of stainless steel or other corrosion resistant materials and is welded to flange 22. Pressure port 28 provides a Junction point for remote transmitting hardware, such as pressure transmitter 26.

Figure 2C:
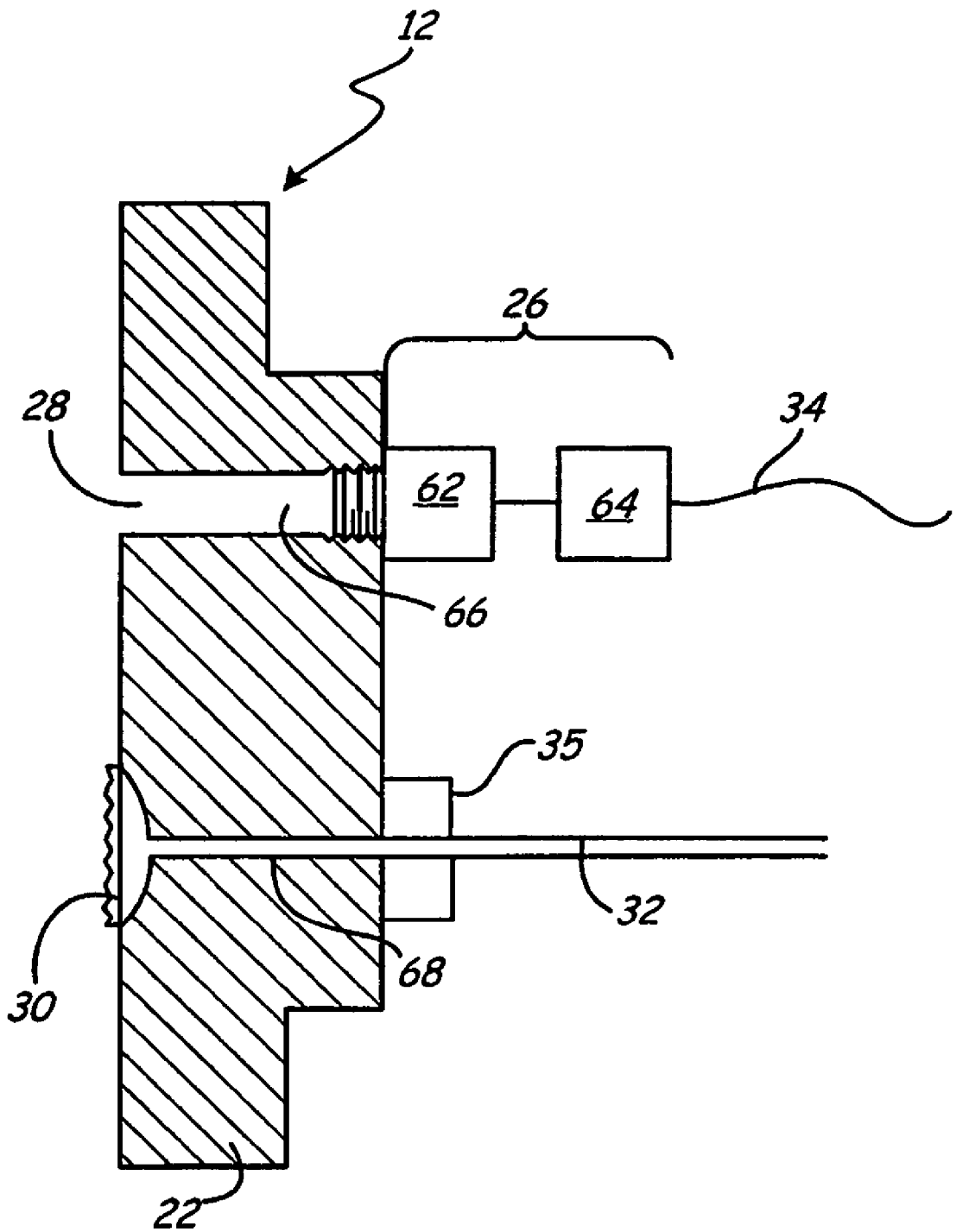
FIG. 2C is cross section 2-2 of FIGS. 2A and 2B showing the redundant remote seal with remote monitoring hardware attached.

FIG. 2C is cross section 2-2 of FIGS. 2A and 2B showing redundant remote seal 12 with remote monitoring hardware attached. Remote seal 12 includes flange 22, process port 28, diaphragm 30, first channel 66 and second channel 68. Remote seal 12 is equipped with remote transmitting hardware: pressure transmitter 26, capillary 32, coupling 35 and other related components. Pressure transmitter 26 includes second sensor 62 and sensor electronics 64.

Flange 22 provides a connection between process port 28 and diaphragms 30 and the remote transmitting hardware. Process port 28 is linked with second sensor 62 through first channel 66. Sensor 62 is secured to first channel 66 with, for example, a threaded connection in access hole 28. Second channel 68 is linked with capillary 32 with for example a weld or threaded connection for receiving coupling 35. Second channel 68 is filled with the first fill fluid and communicates the deflection of diaphragm 30 to transmitter diaphragm 43.

Second sensor 62 preferably comprises a gage pressure sensor and produces an output signal proportional to the pressure sensed in process fluid 20. Second sensor 62, and first sensor 38, can be, for example, a capacitance-based pressure cell, in which the capacitance of the sensor changes as a function of the pressure of process fluid 20, or can operate on other known sensing principles, such as piezoresistive strain gage technology. Sensor electronics 64 preferably includes a temperature sensor and receives and conditions the output signal of second sensor 62. Sensor electronics 64 transmits the output across communication link 34 to transmitter circuitry 40 as the second pressure signal. In one embodiment, communication link 34 comprises a wired communication cable. Together, sensor electronics 64 and communication link 34 comprise an electronic communication system.

The pressure of process fluid 20 also deflects diaphragm 30, which forces the first fill fluid of channel 68 and capillary 32 against transmitter diaphragm 43 of process transmitter 14. Transmitter diaphragm 43 subsequently pushes the second fill fluid of passageway 44 against first sensor 38, thus producing the first pressure signal, which is relayed to transmitter electronics 40. The first pressure signal and second pressure signal can then be analyzed, diagnosed, compared or evaluated for quality control or evaluative measures.

Transmitter circuitry 40 may preferably perform various analyses of the first and second pressure signals, independently and together for instance.

Transmitter circuitry 40 determines if the two pressure signals are within an acceptable error band of each other. If the two signals fall within the error band, transmitter 14 can proceed operating on the basis of accurate information and no further steps need to be taken by an operator. If the signals fall outside of the error band, transmitter 14 communicates over control loop 48 to an operator in control room 16, or at a local LCD screen, that there is a problem with the data and corrective steps need to be taken. The width of the error band can be programmed based on the specific application or the amount of control needed over process fluid 20. Transmitter circuitry 40 also monitors patterns in the two signals. For example, if the signals are diverging, transmitter 14 can give an early warning to an operator so that preventative maintenance may be taken.

Transmitter circuitry 40 also performs time-response comparisons of the two signals. Typically, the signal generated from the electronic remote seal sub-system, i.e. the second signal from communication link 34, is relayed to transmitter 14 faster than the signal from the mechanical remote seal sub-system, i.e. the first signal from sensor 38. Thus, if transmitter circuitry 40 detects a growing lag in receiving the first signal as compared to when it receives the second signal, this may be indicative of a fill fluid leak in capillary 32. Similarly, if transmitter circuitry 40 detects a growing lag from the second signal, it may be indicative of pressure port 28 becoming clogged. Transmitter 14 can then communicate via control room 16 or a local display any corrective actions that may be needed.

Transmitter circuitry 40 also preferably performs filtering and conditioning functions for both the electronic and mechanical remote seal functions, such as temperature compensation and tuning calibration functions. Transmitter circuitry 40 and transmitter 26 include temperature sensors that are used to compensate sensor 38 and sensor 62 based on variations of ambient and local temperatures. These temperature sensors can also be used to compensate the mechanical remote seal system. Temperature differences between remote seal 12 and pressure transmitter 14 affects the ability of the fill fluid in capillary 32 to transmit pressure. For example, changes to the density or volume of the fill fluid will affect the pressure transmitted to sensor 38. Transmitter circuitry 40 can use the temperature data of sensor 38 and sensor 62 to compensate sensor 38 for any change in the pressure relayed through capillary 32.

Also, transmitter circuitry 40 can select between the first pressure signal and the second pressure signal based on optimal performance conditions. For example, when temperatures and the level of process fluid 20 are stable, the mechanical remote seal sub-system and the first signal will be more accurate. When temperatures are rapidly changing or when the temperature difference between remote seal 12 and pressure transmitter 14 are large, the electronic remote seal sub-system and the second signal will be more accurate. Thus, transmitter circuitry 40 can monitor rapidly changing conditions and select which system will give more accurate results, and convey this signal to the operator.

FIG. 3 shows process control system 70 in which transmitter 71 is in a balanced differential pressure measurement configuration. Process control system 70 includes components used in process control system 10 of FIG. 1, and common numbering is used where applicable. Process control system 70 includes remote seal 12, control room 16, vessel 18, process fluid portion 20A, process fluid portion 20B, process transmitter 71 and second remote seal 72. Remote seal 72 includes flange 76, second remote pressure transmitter 78, process port 80, isolation diaphragm 82, capillary 84 and communication link 86. Capillary 84 is connected with remote seal 72 using coupling 88 and with transmitter 71 using coupling 90. Second remote seal 72 is constructed in accord with the construction of remote seal 12. Remote seal 12 and remote seal 72 can be connected with process flange 17 and process flange 98, respectively, using threaded fasteners such as with bolt 54 and nut 56.

Transmitter 71 includes passageway 92, differential pressure sensor 94 and transmitter circuitry 96. First remote seal 12 and second remote seal 72 are positioned along vessel 18 to sense pressure at two different portions of process fluid 20: portions 20A and 20B. In one embodiment, portions 20A and 20B are vertical portions of a process fluid contained in a pressure vessel, such that differential pressure can be sensed at different heights of the vessel. In another embodiment, portions 20A and 20B are portions of a process fluid on either side of a flow restriction device in a process fluid pipeline, such that flow measurements can be calculated.

Similar to what was described above, process port 28 is used with first pressure transmitter 26 to sense the pressure of first process fluid portion 20A, which is then transmitted to circuitry 96 through communication link 34. Also, isolation diaphragm 30 is used with capillary 32 to mechanically transmit the pressure of process fluid 20A to transmitter 71.

Similarly, process port 80 is used with second remote pressure transmitter 78 to sense the pressure of second process fluid portion 20B. Pressure transmitter 78 includes circuitry for relaying an electronic pressure signal to transmitter circuitry 96 through communication link 86. Isolation diaphragm 82 is used with capillary 84 to relay the pressure of process fluid portion 20B to transmitter 71 via another fill fluid. The pressure is transmitted to passageway 92 and onto differential pressure sensor 94. Thus, pressure sensor 94 senses the pressure differential between the pressure conveyed by capillary 32 of remote seal 12 and capillary 84 of remote seal 72 to produce a differential pressure value, which is representative of the pressure differential between process fluid portions 20A and 20B. This differential pressure is conveyed to circuitry 96. Circuitry 96 also receives the first and second gage pressure signals produced by first pressure transmitter 26 and second pressure transmitter 78, where a second differential pressure value can be derived from the two gage pressure signals. Thus, transmitter circuitry 96 can compare and analyze the differential pressure signals to assist in determining malfunctioning sensors and electronics, and leaks in the remote seal system. Particularly, transmitter circuitry 96 can perform functions and analyses similar to what was described for transmitter circuitry 40. For example, transmitter circuitry 96 determines if the derived differential pressure and the sensed differential pressure are within an error band of each other, can perform temperature compensation, determine which signals may be more accurate, or diagnose current and potential hardware malfunctions.

In other embodiments of process control system 70, process transmitter 71 can be located directly on vessel 18 at the site of remote seal 72, or in another tuned configuration. In such a configuration, transmitter housing 36 is coupled with vessel 18 in order to obtain the second mechanically sensed pressure for differential sensor 94, and the need for second remote seal 72 is eliminated.

Although the present invention has been described with reference to preferred embodiments, workers skilled in the art will recognize that changes may be made in form and detail without departing from the spirit and scope of the invention.

The invention claimed is:

1. A process transmitter for measuring pressure of a process fluid, the process transmitter comprising:

a transmitter housing;
transmitter circuitry positioned within the transmitter housing;
a remote seal assembly comprising:
  a remote seal flange in communication with the process fluid;
  a first pressure sensor attached to the remote seal flange for sensing pressure of the process fluid through contact with the process fluid;
  an electronic communication system for relaying an output of the first pressure sensor to the transmitter circuitry; and
  a capillary tube for communicating the process fluid pressure to the transmitter housing via a fill fluid; and
a second pressure sensor positioned in the transmitter housing for sensing pressure of the process fluid through the fill fluid of the capillary.

2. The process transmitter of claim 1 wherein the remote seal flange includes a process port extending through the remote seal flange to mount the first pressure sensor.

3. The process transmitter of claim 1 wherein the remote seal flange includes an isolation diaphragm positioned between the process fluid and the capillary such that the process fluid pressure is transmitted from the isolation diaphragm to the second pressure sensor through the capillary.

4. The process transmitter of claim 3 and further comprising a fill fluid positioned in the capillary between the isolation diaphragm and the second pressure sensor.

5. The process transmitter of claim 1 wherein the electronic communication system comprises circuitry and a communication cable.

6. The process transmitter of claim 1 wherein the electronic communication system comprises a wireless communication link.

7. The process transmitter of claim 1 wherein the first pressure sensor produces a first pressure signal and the second pressure sensor produces a second pressure signal, and the transmitter circuitry receives the first and second pressure signals.

8. The process transmitter of claim 7 wherein the transmitter circuitry performs time-response analyses of the first and second pressure signals.

9. The process transmitter of claim 7 wherein the transmitter circuitry performs temperature compensation analyses of the first and second pressure signals.

10. The process transmitter of claim 7 wherein the transmitter circuitry determines if the first and second pressure signals are within an error band of each other.

11. The process transmitter of claim 7 wherein the transmitter circuitry relays the first and second pressure signals to a control room over a control loop.

12. The process transmitter of claim 1 wherein the second pressure sensor is a differential pressure sensor and senses differential pressure of the process fluid through the first fill fluid of the capillary and the second fill fluid of the second capillary.

13. The process transmitter of claim 12 wherein the first pressure sensor and the third pressure sensor produce output signals received by the transmitter circuitry, and the transmitter circuitry derives a differential pressure from the output signals.

14. The process transmitter of claim 13 wherein the sensed differential pressure of the second pressure sensor and the derived differential pressure of the transmitter circuitry are received by the transmitter circuitry.

15. The process transmitter of claim 14 wherein the transmitter circuitry determines if the sensed differential pressure and the derived differential pressure are within an error band of each other.

16. The process transmitter of claim 14 wherein the transmitter circuitry performs temperature compensation analyses of the sensed differential pressure and the derived differential pressure.

17. The process transmitter of claim 14 wherein the transmitter circuitry performs time-response analyses of the sensed differential pressure and the derived differential pressure.

18. The process transmitter of claim 14 wherein the transmitter circuitry relays the sensed differential pressure and the derived differential pressure to a control room over a control loop.

19. A pressure measurement system for redundantly measuring a first pressure of a process fluid, the pressure measurement system comprising:
  a process transmitter comprising transmitter circuitry;
  a first remote seal assembly comprising:
    first sensing means for directly sensing the first pressure of the process fluid;
    first electronic means for communicating a sensed first pressure signal from the first sensing means to the transmitter circuitry; and
    first mechanical means for physically transmitting the first pressure of the process fluid to the process transmitter; and
  second sensing means positioned in the process transmitter for sensing the first pressure of the process fluid utilizing a physically transmitted first pressure of mechanical means.

20. The pressure measurement system of claim 19 wherein the first and second sensing means comprise gage pressure sensors.

21. The pressure measurement system of claim 19 wherein the electronic means comprises circuitry and a communication cable.

22. The pressure measurement system of claim 19 wherein the mechanical means comprises a hydraulic remote seal system.

23. The pressure measurement system of claim 19 wherein the transmitter circuitry receives sensed first pressure signals from the first and second sensing means, and performs analyses of the received sensed first pressure signals.

24. The pressure measurement system of claim 19 wherein the second sensing means is a differential pressure sensor and senses differential pressure of the process fluid through the first mechanical means and second mechanical means.

25. The pressure measurement system of claim 24 wherein the first sensing means and the third sensing means produce output signals received by the transmitter circuitry, and the transmitter circuitry derives a differential pressure from the output signals.

26. The pressure measurement system of claim 25 wherein the sensed differential pressure of the second sensing means and the derived differential pressure of the transmitter circuitry are compared by the transmitter circuitry.

27. The pressure measurement system of claim 26 wherein the transmitter circuitry determines if the sensed differential pressure and the derived differential pressure are within an error band of each other.

28. The pressure measurement system of claim 26 wherein the transmitter circuitry performs temperature compensation analyses on the sensed differential pressure and the derived differential pressure.

29. The pressure measurement system of claim 26 wherein the transmitter circuitry performs time-response analyses of the sensed differential pressure and the derived differential pressure.

30. The pressure measurement system of claim 26 wherein the transmitter circuitry relays the sensed differential pressure and the derived differential pressure to a control room over a control loop.

31. A redundant remote seal for use with a process transmitter, the redundant remote seal comprising:
 a process flange having an isolation diaphragm for interfacing with a process fluid;
 a gage pressure sensor coupled to the process flange for sensing pressure of the process fluid through a process port extending through the process flange such that the gage pressure sensor communicates with the process fluid;
 a communication system for receiving a pressure signal from the gage pressure sensor and communicating with the process transmitter; and
 a capillary tube linking the isolation diaphragm with the process transmitter.

32. A process transmitter for measuring pressure of a process fluid, the process transmitter comprising:
 a transmitter housing;
 transmitter circuitry positioned within the transmitter housing;
 a first remote seal assembly comprising:
  a first remote seal flange in communication with the process fluid;
  a first pressure sensor attached to the remote seal flange for sensing a first pressure of the process fluid;
  a first communication system for relaying an output of the first pressure sensor to the transmitter circuitry; and
  a first capillary tube for communicating the first pressure of the process fluid to the transmitter housing via a first fill fluid;
 a second pressure sensor positioned in the transmitter housing for sensing pressure of the process fluid through the first fill fluid of the first capillary; and
 a second remote seal assembly comprising:
  a second remote seal housing in communication with the process fluid;
  a third pressure sensor attached to the second remote seal housing for sensing a second pressure of the process fluid;
  a second communication system for relaying an output of the third pressure sensor to the transmitter circuitry; and
  a second capillary tube for communicating the second pressure of the process fluid to the second sensor of the transmitter housing via a second fill fluid.

33. A pressure measurement system for redundantly measuring a first pressure of a process fluid, the pressure measurement system comprising:
 a process transmitter comprising transmitter circuitry;
 a first remote seal assembly comprising:
  first sensing means for sensing the first pressure of the process fluid;
  first electronic means for communicating with the transmitter circuitry; and
  first mechanical means for transmitting the first pressure of the process fluid to the process transmitter;
 second sensing means positioned in the process transmitter for sensing the first pressure of the process fluid utilizing the mechanical means; and
 a second remote seal assembly comprising:
  a third sensing means for sensing a second pressure of the process fluid;
  second electronic means for communicating with the transmitter circuitry; and
  second mechanical means for transmitting the second pressure of the process fluid to the second sensing means of the process transmitter.

\* \* \* \* \*

UNITED STATES PATENT AND TRADEMARK OFFICE
CERTIFICATE OF CORRECTION

| | | |
|---|---|---|
| PATENT NO. | : 7,412,893 B2 | Page 1 of 1 |
| APPLICATION NO. | : 11/387550 | |
| DATED | : August 19, 2008 | |
| INVENTOR(S) | : Robert Hedtke | |

It is certified that error appears in the above-identified patent and that said Letters Patent is hereby corrected as shown below:

Column 4, Line 19, delete "Junction", insert --junction--

Signed and Sealed this

Thirtieth Day of December, 2008

JON W. DUDAS
*Director of the United States Patent and Trademark Office*